(12) United States Patent  (10) Patent No.: US 8,355,640 B2
Tabuchi  (45) Date of Patent: Jan. 15, 2013

(54) DOCUMENT FEEDING DEVICE THAT PERFORMS AN INITIAL OPERATION, IMAGE FORMING APPARATUS INCLUDING THE SAME, AND METHOD OF CONTROLLING A DOCUMENT FEEDING DEVICE THAT PERFORMS AN INITIAL OPERATION

(75) Inventor: Hidehiro Tabuchi, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 0 days.

(21) Appl. No.: 13/280,655

(22) Filed: Oct. 25, 2011

(65) Prior Publication Data

US 2012/0104692 A1  May 3, 2012

(30) Foreign Application Priority Data

Oct. 28, 2010  (JP) ................................ 2010-242852

(51) Int. Cl.
G03G 15/00 (2006.01)
B65H 1/00 (2006.01)
(52) U.S. Cl. .............. 399/17; 399/16; 399/365; 271/8.1
(58) Field of Classification Search .................. 271/109, 271/8.1; 399/16, 17, 18, 21, 365
See application file for complete search history.

(56) References Cited

U.S. PATENT DOCUMENTS

| 5,142,323 | A * | 8/1992 | Iwamoto | 399/17 |
| 6,647,240 | B2 * | 11/2003 | Fujii | 399/371 |
| 6,952,537 | B2 * | 10/2005 | Fujii | 399/17 |
| 6,999,211 | B2 * | 2/2006 | Sekiya et al. | 358/498 |
| 2006/0140649 | A1 * | 6/2006 | Ichihashi | 399/17 |
| 2007/0177887 | A1 * | 8/2007 | Haas et al. | 399/17 |
| 2008/0205912 | A1 * | 8/2008 | Arakawa | 399/16 |
| 2010/0178068 | A1 * | 7/2010 | Kamata et al. | 399/16 |

FOREIGN PATENT DOCUMENTS

JP  2000-50005  2/2000

* cited by examiner

*Primary Examiner* — Kaitlin Joerger
(74) *Attorney, Agent, or Firm* — Smith, Gambrell & Russell, LLP

(57) ABSTRACT

Provided is a document feeding device including: a document feeding portion for feeding a document; a document set detecting portion for detecting presence/absence of a set document; a determination portion for determining whether power supply to the device is started by turning-on of main power or by cancellation of a power saving mode; an initial operation portion for performing an initial operation of initializing the document feeding portion when the power supply to the document feeding device is started by the turning-on of the main power, and restricting execution of the initial operation when the power supply to the document feeding device is started by the cancellation of the power saving mode; and a display portion for displaying, when there is a set document at the start of the power supply, a request to reset the document.

9 Claims, 6 Drawing Sheets

DOCUMENT FEEDING DEVICE THAT PERFORMS AN INITIAL OPERATION, IMAGE FORMING APPARATUS INCLUDING THE SAME, AND METHOD OF CONTROLLING A DOCUMENT FEEDING DEVICE THAT PERFORMS AN INITIAL OPERATION

This application is based upon and claims the benefit of priority from the corresponding Japanese Patent Application No. 2010-242852 filed on Oct. 28, 2010, the entire contents of which are incorporated herein by reference.

BACKGROUND OF THE INVENTION

1. Field of the Invention

The present invention relates to a document feeding device for feeding documents one by one for reading. The present invention also relates to an image forming apparatus including the document feeding device.

2. Description of Related Art

Conventionally, in order to copy or scan a plurality of sheets of documents at high speed, some types of image forming apparatuses such as a scanner, a multifunction peripheral, and a fax machine have been provided with a document feeding device. The document feeding device feeds documents placed on a document tray one by one to a reading position automatically and continuously.

For example, there is known an image forming apparatus provided with a document feeding device and having the following configuration. Specifically, the image forming apparatus, in which a series of documents set in automatic document feeding means are sequentially conveyed, an image on the conveyed document is read and stored in storage means, and an image is formed by reading image information stored in the storage means, includes: first setting means for setting a document page of the image information already stored in the storage means, when a jam of a document being conveyed by the automatic document feeding means has occurred; second setting means for setting a document page from which the reading of the series of documents is resumed; and control means for, when the series of documents are set again in the automatic document feeding means, performing control so as to idle-eject documents up until the document page set by the first setting means, start reading an image from the document page set by the second setting means, and store the image in the storage means. This configuration attempts to enable accurate and easy return processing from a paper jam that has occurred during the conveyance of documents.

First, the document feeding device is provided with a rotary member (for example, roller) for feeding documents. The rotary member is in contact with a topmost document. Then, the rotary member is driven, thereby feeding the document (performing sheet feeding).

Here, the amount of documents placed on the document feeding device varies. Accordingly, the rotary member that feeds documents is configured to be swingable (movable) in the vertical direction to some degree. However, if the rotary member is positioned low before documents are set, there may occur such a drawback that the number of placeable document sheets becomes smaller. Further, such a drawback that documents cannot be placed appropriately may also occur. To address this, in some cases, the initial operation of the rotary member is performed. For example, in the initial operation, the rotary member is lifted up to an upper (upper limit) position by using a motor or a solenoid.

However, when there are set documents, the initial operation is difficult to perform. This may prevent the initial operation from being performed appropriately. To address this, when there are set documents at the time of the initial operation, a reset request making a request to remove documents from the tray and place the documents again is displayed on, for example, a liquid crystal panel of the image forming apparatus or the like. Note that, when the documents have been removed temporarily, the initial operation is performed.

It is unclear whether or not the initial operation has been performed properly before the power supply is stopped. Accordingly, when the power supply to the document feeding device is resumed, in some cases, the initial operation is performed as one of initialization operation steps. For example, the power supply is resumed when main power has been turned on or when a power saving mode such as a sleep mode has been canceled.

However, conventional document feeding devices do not distinguish between the case where the power supply is resumed by the cancellation of the power saving mode and the case where the power supply is resumed by the turning-on of the main power. Accordingly, even when there is no need to display the reset request because the power supply is resumed by the cancellation of the power saving mode, the reset request is displayed if there is a set document. This is problematic in that a user is forced to bear unnecessary trouble (removal and reset of documents). Further, when a power saving mode has been canceled, the reading of the documents cannot be performed immediately, resulting in a complicated document feeding device that is difficult to use. Further, in consideration of the recent trend for energy saving (power saving), there are increasing tendencies to set the document feeding device or the like in the power saving mode, and hence there is a high demand for improvement.

Note that, the above-mentioned conventional document feeding device and image forming apparatus are intended for accurately and easily performing the processing of returning from a paper jam or the like that has occurred in the course of a reading job. Therefore, the conventional document feeding device and image forming apparatus have no relevance to the problems related to the initial operation and to the mode regarding the power saving, and thus cannot solve the problems that the document feeding device and the image forming apparatus are difficult to use due to the unnecessary reset request.

SUMMARY OF THE INVENTION

In view of the above-mentioned problems inherent in the conventional technology, the present invention has an object to improve usability of a document feeding device by minimizing the number of times an initial operation is performed in a document feeding device, and, when there is no need to reset documents, such as at the time of cancellation of a power saving mode, performing reading of the documents without requiring the reset.

In order to solve the above-mentioned problems, according to one aspect of the present invention, there is provided a document feeding device including: a document feeding portion for feeding a document from a document tray on which one or a plurality of sheets of documents are placed; a document set detecting portion for detecting whether or not there is a document set on the document tray; a determination portion for determining whether power supply to the document feeding device is started by turning-on of main power through turning on a main switch or by cancellation of a power saving mode; an initial operation portion for performing an initial operation of initializing the document feeding portion under a state in which there is no set document, performing the initial operation when the power supply to the document feeding device is started by the turning-on of the main power, and restricting execution of the initial operation when the power supply to the document feeding device is started by the cancellation of the power saving mode; and a display portion for displaying, when the initial operation is to be performed and there is a set document at the start of the power supply, a reset request making a request for reset of the document.

The present invention can provide the document feeding device and the image forming apparatus that minimize the number of times the initial operation is performed. Further, the present invention can provide the document feeding device and the image forming apparatus that are easy to use because even when there are set documents at the time of the cancellation of the power saving mode, the documents do not need to be reset, and the reading of the documents can be performed immediately.

Further features and advantages of the present invention will become apparent from the description of embodiments given below.

DETAILED DESCRIPTION OF PREFERRED EMBODIMENT

Hereinbelow, referring to FIGS. 1 to 7, a document feeding device 1 according to an embodiment of the present invention is described. In this embodiment, described is an example in which the document feeding device 1 is included in a multifunction peripheral 100 (corresponding to an image forming apparatus). Note that, elements such as configuration and layout described in this embodiment are provided merely by way of example and not by way of limitation.

(Overview of Image Forming Apparatus)

Figure 1:
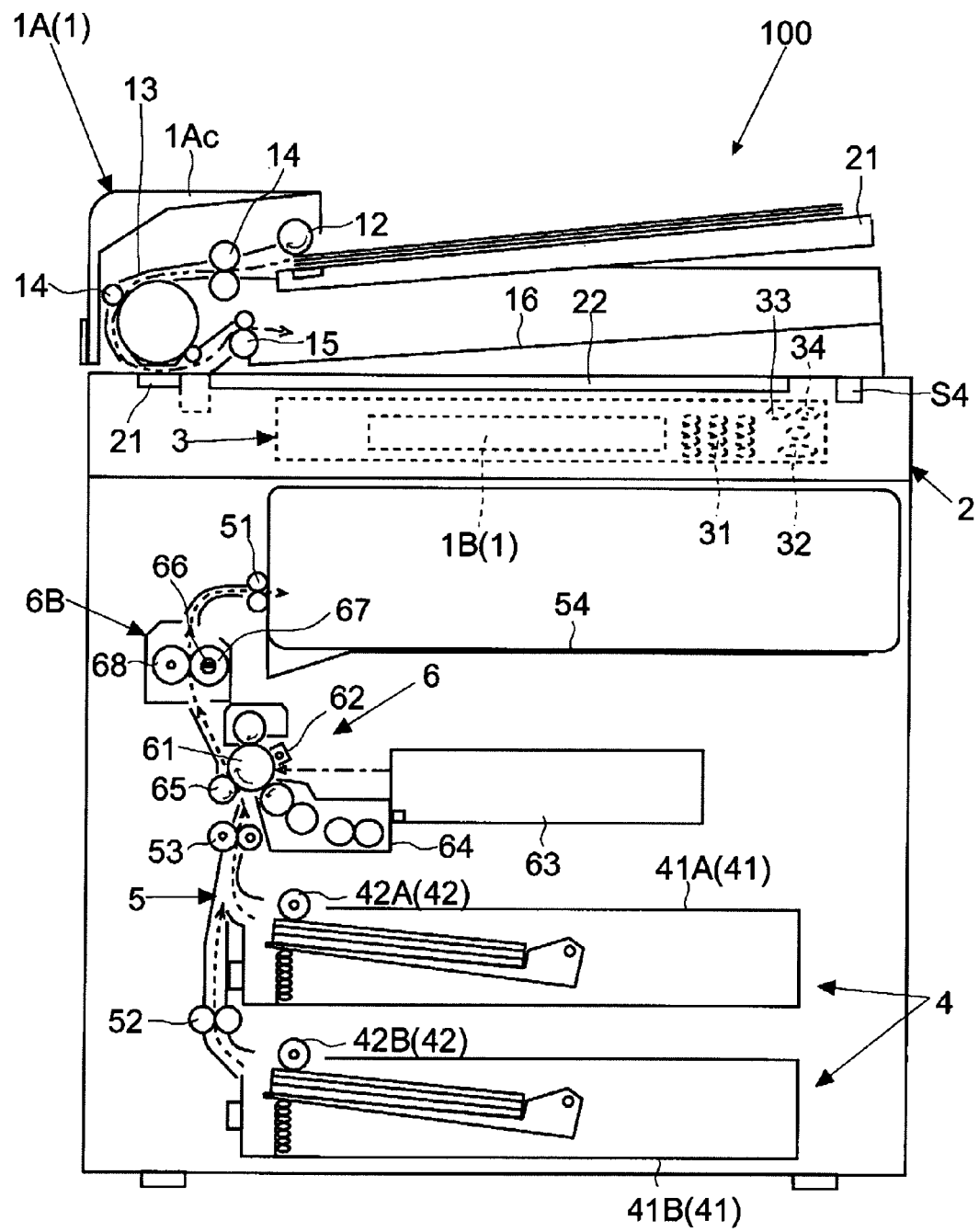
FIG. 1 is a sectional front view schematically illustrating an example of a multifunction peripheral.

First, referring to FIG. 1, the overview of the multifunction peripheral 100 according to the embodiment is described. FIG. 1 is a sectional front view schematically illustrating an example of the multifunction peripheral 100.

As illustrated in FIG. 1, the multifunction peripheral 100 of this embodiment includes, in an upper part thereof, an image reading portion 2 and a document conveying portion 1A (main part of the document feeding device 1). The image reading portion 2 and the document conveying portion 1A are described later in detail. Further, an operation panel 3 is provided at a front of the image reading portion 2. Note that, in FIG. 1, the operation panel 3 is indicated by broken lines.

The operation panel 3 includes a touch panel type liquid crystal display portion 1B (corresponding to a display portion) that displays keys for setting the multifunction peripheral 100 and receives input from a user. Note that, the operation panel 3 functions not only as the display portion of the multifunction peripheral 100 but also as the display portion of the document feeding device 1. For example, the liquid crystal display portion 1B can display the states of the multifunction peripheral 100 and the document conveying portion 1A.

Further, the operation panel 3 is provided with a numeric keypad portion 31 for inputting numerals such as the number of copies. Further, the operation panel 3 is also provided with a start key 32 for giving an instruction to execute copying or scanning. Further, the operation panel 3 is also provided with a power saving key 33 for giving an instruction to shift from a normal mode to a power saving mode. Further, the operation panel 3 is also provided with a power key 34 for turning on/off power supply. As described above, the operation panel 3 is provided with various kinds of hard keys. Note that, as for the power saving mode, by depressing (operating) the power key 34 or the power saving key 33, the power saving mode may be canceled (shift from the power saving mode to the normal mode).

Further, as illustrated in FIG. 1, in addition to the document conveying portion 1A, the operation panel 3, and the image reading portion 2, a main body of the multifunction peripheral 100 includes a sheet feeding portion 4, a conveyance path 5, an image forming portion 6, a fixing portion 6B, and the like.

The document conveying portion 1A conveys documents automatically and continuously one by one to a reading position (contact glass 21 for feed reading) of the image reading portion 2. The document conveying portion 1A can be opened or closed in a longitudinal direction of the drawing sheet with a depth-direction side of the drawing sheet of FIG. 1 as a point of support. The document conveying portion 1A presses down a document placed on a contact glass 22 for placement reading at the time of copying the document. The image reading portion 2 reads a document and forms image data of the document. Further, the image reading portion 2 includes optical system members such as an exposure lamp 25, mirrors, a lens 24, and an image sensor 26 (details are described later).

Then, those optical system members are used to apply light to a document placed on the contact glass 22 for placement reading or to a conveyed document, and guide the light reflected from the document to the image sensor 26. The output value of each pixel of the image sensor 26 is A/D-converted, to thereby generate image data. The multifunction peripheral 100 can perform printing based on the image data obtained by the reading (copy function).

The sheet feeding portion 4 accommodates a plurality of sheets (for example, copy paper, plain paper, recycled paper, cardboard, and various sheets such as OHP sheets). Then, the sheet feeding portion 4 feeds sheets one by one to the conveyance path 5. In cassettes 41 of the sheet feeding portion 4, sheets to be accommodated are placed (in FIG. 1, the upper one is denoted by reference symbol 41A, and the lower one is denoted by reference symbol 41B). Further, each of the cassettes 41 is provided with a sheet feeding roller 42 that is rotationally driven to feed sheets to the conveyance path 5 (in FIG. 1, the upper one is denoted by reference symbol 42A, and the lower one is denoted by reference symbol 42B). At the time of printing, the sheet feeding roller 42 is rotationally driven, thereby feeding sheets one by one to the conveyance path 5.

The conveyance path 5 is a path along which sheets supplied from the sheet feeding portion 4 are conveyed. Along the sheet conveying route, there are disposed the image forming portion 6, the fixing portion 6B, and the like. Then, provided to the conveyance path 5 are, for example, a guide for guiding sheets, conveyance roller pairs 51 and 52 that are rotationally driven when a sheet is conveyed, and a registration roller pair 53 that holds a conveyed sheet in front of the image forming portion 6 and feeds the sheet in synchronization with a timing at which a toner image is formed.

The image forming portion 6 forms a toner image based on the image data, and transfers the toner image onto a conveyed sheet. To this end, the image forming portion 6 includes a photosensitive drum 61 supported so as to be rotationally driven in the arrow direction indicated in FIG. 1. Further, the image forming portion 6 includes a charging device 62, an exposure device 63, a developing device 64, a transfer roller 65, and the like, which are arranged around the photosensitive drum 61.

Description is now given of toner image formation and a transfer process. The photosensitive drum 61 is provided substantially at the center of the image forming portion 6. The photosensitive drum 61 is rotationally driven in a predetermined direction. The charging device 62 charges the photosensitive drum 61 to a predetermined potential. Based on the image data, the exposure device 63 outputs a laser beam to scan and expose a surface of the photosensitive drum 61. With this, an electrostatic latent image is formed on the photosensitive drum 61 according to the image data. Note that, the image data to be used includes image data obtained by the image reading portion 2 and image data transmitted from an external computer 200 or a communication partner's fax machine 300 that are connected via a network or the like (see FIG. 3).

Then, the developing device 64 develops the electrostatic latent image formed on the photosensitive drum 61 by supplying toner thereto. The transfer roller 65 is in pressure contact with the photosensitive drum 61. Then, a sheet is caused to enter a nip formed by the transfer roller 65 and the photosensitive drum 61 in synchronization with a timing at which the toner image is formed. When the sheet enters the nip, a predetermined voltage is applied to the transfer roller 65. This causes the toner image on the photosensitive drum 61 to be transferred onto the sheet.

The fixing portion 6B fixes the toner image that has been transferred onto the sheet. The fixing portion 6B of this embodiment includes a heating roller 67 embedded with a heater 66 and a pressure roller 68. The heating roller 67 and the pressure roller 68 are in pressure contact with each other to form a nip therebetween. When the sheet passes through the nip, the toner thereon is heated/fused. As a result, the toner image is fixed to the sheet. The sheet having the toner fixed thereon is delivered to a delivery tray 54 by the conveyance roller pair 51. Image formation (printing) is performed at the time of using a copy function and a printer function.

(Configuration of Scanner)

Figure 2:
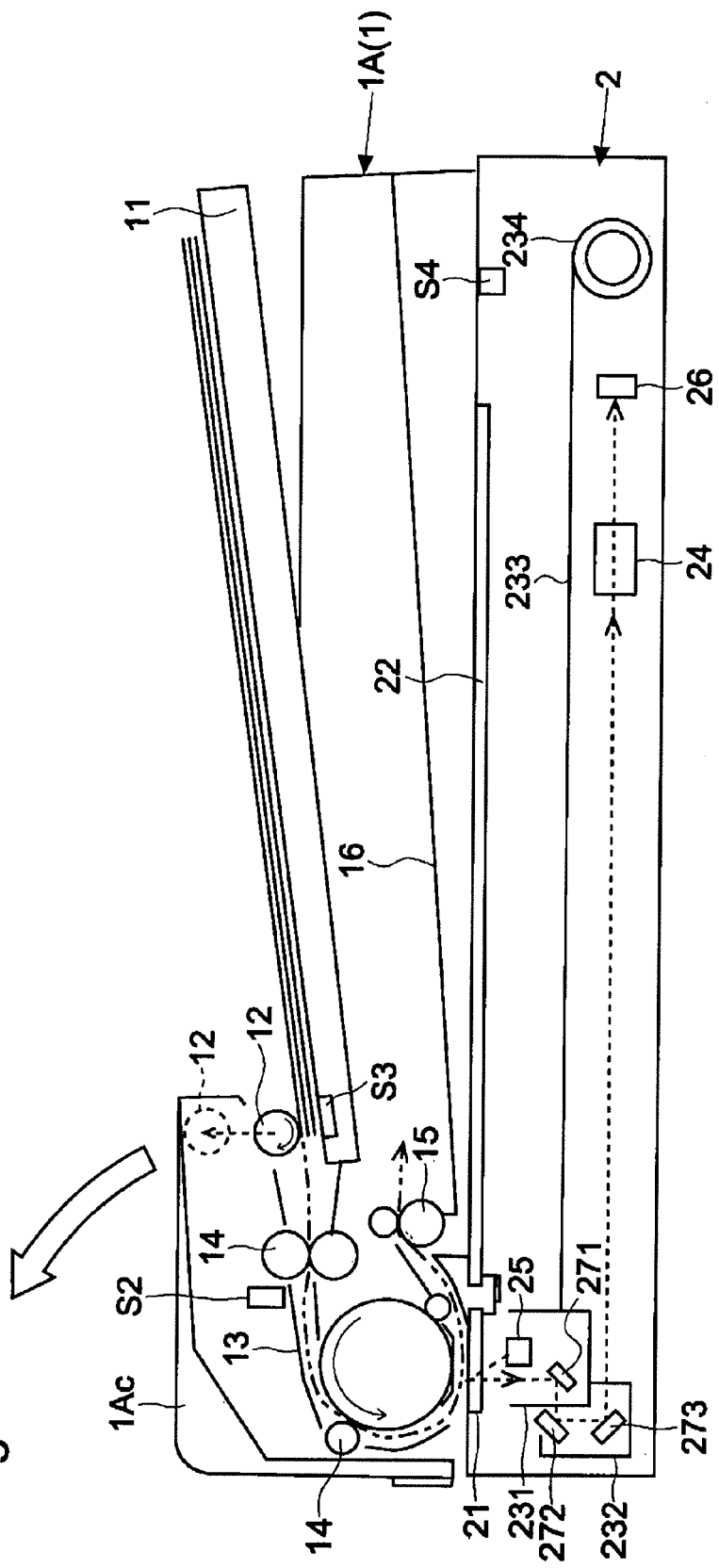
FIG. 2 is a sectional view schematically illustrating an example of a scanner part.

Next, referring to FIG. 2, description is given of a scanner part of the multifunction peripheral 100 according to the embodiment. FIG. 2 is a sectional view schematically illustrating an example of the scanner part of the image forming apparatus. Note that, in FIG. 2, illustration of the operation panel 3 is omitted.

The multifunction peripheral 100 of this embodiment includes the document conveying portion 1A (part of the document feeding device 1) and the image reading portion 2. Scanning of a document is performed by using the document conveying portion 1A (part of the document feeding device 1) and the image reading portion 2.

First, the document conveying portion 1A is provided above the image reading portion 2. Then, the document conveying portion 1A conveys documents to be read (reading targets) one by one automatically and continuously toward the contact glass 21 for feed reading (reading position).

The document conveying portion 1A includes, from an upstream side of a document conveying direction, a document tray 11, a document feeding roller 12 (corresponding to the document feeding portion), a document conveying path 13, a plurality of document conveying roller pairs 14, a document delivery roller pair 15, a document delivery tray 16, and the like. Further, the document conveying portion 1A is mounted so as to be openable/closable in the vertical direction with respect to the image reading portion 2, with the depth-direction side of the drawing sheet of FIG. 2 as a point of support. Then, the document conveying portion 1A functions as a pressing plate for pressing from above each contact glass of the image reading portion 2.

A plurality of sheets of documents are placed on the document tray 11. The document feeding roller 12 is in contact with a topmost document of the documents placed on the document tray 11. The document feeding roller 12 is movable in the vertical direction as indicated by broken lines. Note that, for example, a guide groove provided within the document conveying portion 1A allows the rotational axis of the document feeding roller 12 to move only in the vertical direction, with the result that the movement (swinging) direction of the document feeding roller 12 is restricted.

Before documents are set, the document feeding roller 12 is withdrawn to a basic position indicated by the broken lines (initial operation). An initial operation portion 9 performs this withdrawing operation (details are described later). With the withdrawal to the basic position (initial operation), the document feeding roller 12 does not interfere when documents are placed (does not interfere even when a bundle of documents whose number almost reaches the upper limit of the document tray 11 are to be placed). Then, when documents are fed, the document feeding roller 12 is brought down to be in contact with the topmost document of the documents placed on the document tray 11. When an instruction to perform document reading is input to the multifunction peripheral 100, for example, by the depression of the start key 32, the document feeding roller 12 is rotated to feed the documents one by one to the document conveying path 13.

The fed document is guided by the plurality of document conveying roller pairs 14 and a guide so as to pass above an upper surface of the contact glass 21 for feed reading provided to an upper surface of the image reading portion 2. While the document passes through in this manner, the image reading portion 2 performs the reading. Then, the document that has been read is delivered from the document delivery roller pair 15 to the document delivery tray 16 (document conveying route is indicated by chain double-dashed line). Note that, the respective rotary members described above (document feeding roller 12, document conveying roller pairs 14, and document delivery roller pair 15) are rotated by a conveyance motor 17 (see FIG. 4) as a driving source.

Next, the image reading portion 2 is described. The image reading portion 2 includes, in the upper surface, the contact glass 21 for feed reading, which is used for reading a document conveyed thereto, and the contact glass 22 for placement reading, which is used for reading a document placed thereon.

Further, as illustrated in FIG. 2, in the casing of the image reading portion 2, there are arranged optical system members such as a first moving frame 231, a second moving frame 232, wires 233, a winding drum 234, the lens 24, the lamp 25 for applying light to a document, and the image sensor 26 for reading the document on a line basis and generating the image data based on the incident light applied to the document. The image sensor 26 includes, for example, a charge coupled device (CCD) having photoelectric conversion elements aligned in line. The image sensor reads a document on a line basis in a main scanning direction based on light reflected from the document. The reading is performed on a line basis in the main scanning direction (direction perpendicular to the document conveying direction), and the reading on a line basis is repeated continuously in a sub-scanning direction (document conveying direction), thereby reading one sheet of document.

Light emitted from the lamp 25 is reflected by a document placed on the contact glass 21 for feed reading, and the reflected light is reflected by optical system members such as a first mirror 271 (first moving frame 231), a second mirror 272 (second moving frame 232), and a third mirror 273 (second moving frame 232), and is then guided to the lens 24. The lens 24 condenses the reflected light, which is then caused to enter the image sensor 26.

The plurality of wires 233 are attached to the first moving frame 231 and the second moving frame 232 (in FIG. 2, only one wire is illustrated for the sake of convenience). The other ends of the wires 233 are connected to the winding drum 234, and the winding drum 234 is forward-/reverse-rotated by a winding motor (not shown) as the driving source, to thereby flexibly move the first moving frame 231 and the second moving frame 232 in a horizontal direction.

First, in the case of reading a document conveyed by the document conveying portion 1A, after the winding motor is driven, the first moving frame 231 and the second moving frame 232 are fixed to a position below the contact glass 21 for feed reading (reading position). Then, the lamp 25 applies light to the passing document. On the other hand, in the case of reading a document placed on the contact glass 22 for placement reading, the winding drum 234, the wires 233, and the like are used to move the first moving frame 231 and the second moving frame 232 horizontally in a rightward direction of FIG. 2 from the home position, thereby performing the scanning operation sequentially and continuously until the edge portion of the document.

(Hardware Configuration of Multifunction Peripheral 100)

Figure 3:
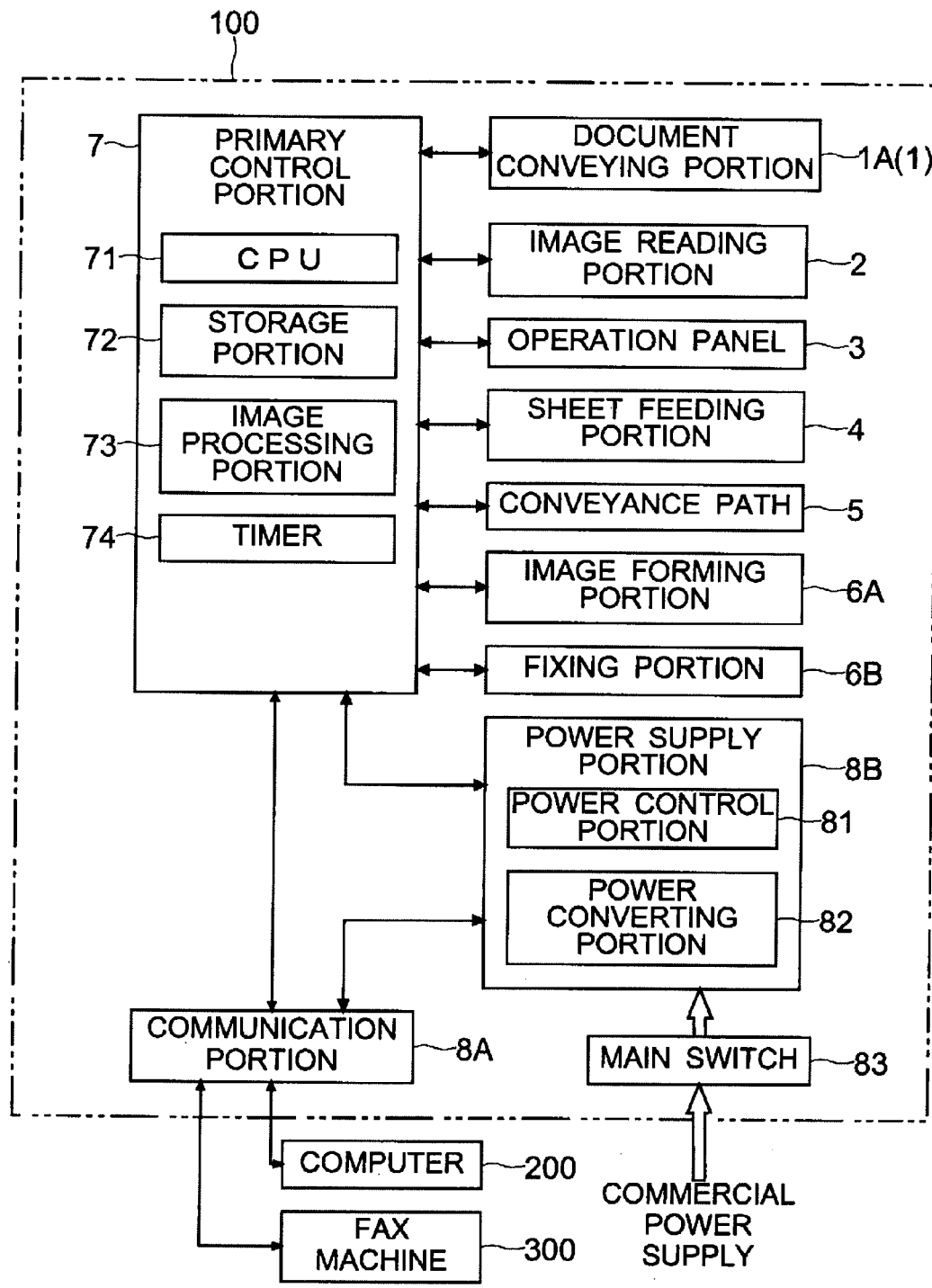
FIG. 3 is a block diagram illustrating an example of a hardware configuration of the multifunction peripheral.

Next, referring to FIG. 3, description is given of an example of a hardware configuration of the multifunction peripheral 100 according to the embodiment. FIG. 3 is a block diagram illustrating an example of the hardware configuration of the multifunction peripheral 100.

First, a primary control portion 7 is provided within the main body of the multifunction peripheral 100. The primary control portion 7 controls the multifunction peripheral 100. The primary control portion 7 is provided with a CPU 71 as a central processing unit. The CPU 71 performs computations and the like based on a control program that is stored in a storage portion 72 and expanded when used, thereby controlling the respective components of the multifunction peripheral 100. Further, the storage portion 72 that is provided within the primary control portion 7 (may be provided outside the primary control portion 7) includes non-volatile and volatile memories such as a random access memory (RAM), a read only memory (ROM), a hard disk drive (HDD), and a flash ROM.

The storage portion 72 stores a program for controlling the multifunction peripheral 100, data, and the like. The primary control portion 7 is communicably connected to the document conveying portion 1A, the image reading portion 2, the operation panel 3, the sheet feeding portion 4, the conveyance path 5, the image forming portion 6, the fixing portion 6B, and the like. The primary control portion 7 uses the program and data stored in the storage portion 72 to control the respective components, thereby causing those components to perform printing, document reading, image data transmission, and the like. Note that, the primary control portion 7 may be divided according to the function into a plurality of kinds of control portions, such as a main control portion for performing overall control, communication control, and image processing, and an engine control portion for controlling printing by, for example, performing the image formation and turning on/off motors and the like that rotate various kinds of rotary members.

Further, for example, the primary control portion 7 includes an image processing portion 73 that carries out image processing on image data obtained by reading a document by the image reading portion 2 or image data input via a communication portion 8A to the multifunction peripheral 100. The image processing portion 73 is a circuit including an ASIC and a working memory for image processing. The image data processed by the image processing portion 73 is, for example, transmitted to the exposure device 63, which then uses the data to scan and expose the photosensitive drum 61. In other cases, the image data is transmitted to the communication portion 8A, which then transmits the data to the outside. Further, a timer 74 of the primary control portion 7 measures a time period required for such control as shift to the power saving mode (the CPU 71 may measure a time period).

Further, the primary control portion 7 is connected to the operation panel 3. The primary control portion 7 recognizes an input made on the operation panel 3. Further, the primary control portion 7 controls the multifunction peripheral 100 so that copying or the like is performed in conformity with the setting made by the user. For example, when an instruction to perform copying has been set on the operation panel 3 by specifying the sheet feeding portion 4 to be used, the primary control portion 7 causes the specified sheet feeding portion 4 to feed a sheet. Further, the primary control portion 7 causes the communication portion 8A to transmit the image data to a transmission destination specified on the operation panel 3.

Further, the communication portion 8A of the multifunction peripheral 100 performs communication with the external computer 200 or the like (for example, personal computer or server). The communication portion 8A includes a circuit for network communication, a communication chip, various kinds of connectors, a socket, and the like. Further, the primary control portion 7 is communicably connected to the communication portion 8A. The primary control portion 7 controls transmission/reception of the communication portion 8A. Further, the primary control portion 7 receives reception data received by the communication portion 8A and transfers transmission data to the communication portion 8A. Further, the communication portion 8A is capable of transmitting the image data obtained by the image reading portion 2 to the computer 200 (scanner function). Further, the communication portion 8A is also capable of transmitting the image data obtained by the image reading portion 2 to the external computer 200. Further, the primary control portion 7 is capable of performing printing based on the image data that has been transmitted and input from the external computer 200 to the multifunction peripheral 100 (printer function).

Further, the communication portion 8A may include a socket for telephone line, a fax modem, and the like for communicating with the external fax machine 300 via a telephone line. In this case, the communication portion 8A can perform transmission/reception of image data to/from the communication partner's fax machine 300 (fax function).

Further, the primary control portion 7 is connected to a power supply portion 8B. The power supply portion 8B includes, inside thereof, a power converting portion 82 for performing rectification, step-down and step-up of voltage, and the like. The power converting portion 82 receives power (commercial power supply) supplied from the outside, to thereby generate a voltage to be supplied to motors (for example, DC 24 V) and a voltage to be supplied to the primary control portion 7, the operation panel 3, the storage portion 72, and the communication portion 8A (for example, DC 5 V, 3.3 V, and 1.8 V).

Further, the power supply portion 8B includes a power control portion 81 for controlling the kind of voltage to be generated in the power supply portion 8B and supply/shut-off of power to the respective components of the multifunction peripheral 100. The power control portion 81 controls the power converting portion 82 so that, in the normal mode, all kinds of voltage necessary for operating the multifunction peripheral 100 are generated. Further, the power control portion 81 supplies power to the entire multifunction peripheral 100.

On the other hand, in the power saving mode, the power control portion 81 causes the power converting portion 82 to generate only a voltage that is to be supplied to parts that are to be operated even in the power saving mode. Then, the power control portion 81 supplies power only to the parts that are to be operated even in the power saving mode. Accordingly, for example, the power control portion 81 includes a switching circuit (switching element), with which the power control portion 81 separates a part that is to be supplied with power and a part that is not to be supplied with power. Note that, details of the normal mode and the power saving mode are described later.

Note that, the multifunction peripheral 100 of this embodiment is provided with a main switch 83 for turning on or shutting off power supplied from the outside. For example, the main switch 83 is a mechanical switch provided on a side surface or the like of the multifunction peripheral 100. By turning on/off the main switch 83, it is possible to switch between turning-on and shut-off of main power.

(Hardware Configuration of Document Feeding Device 1)

Figure 4:
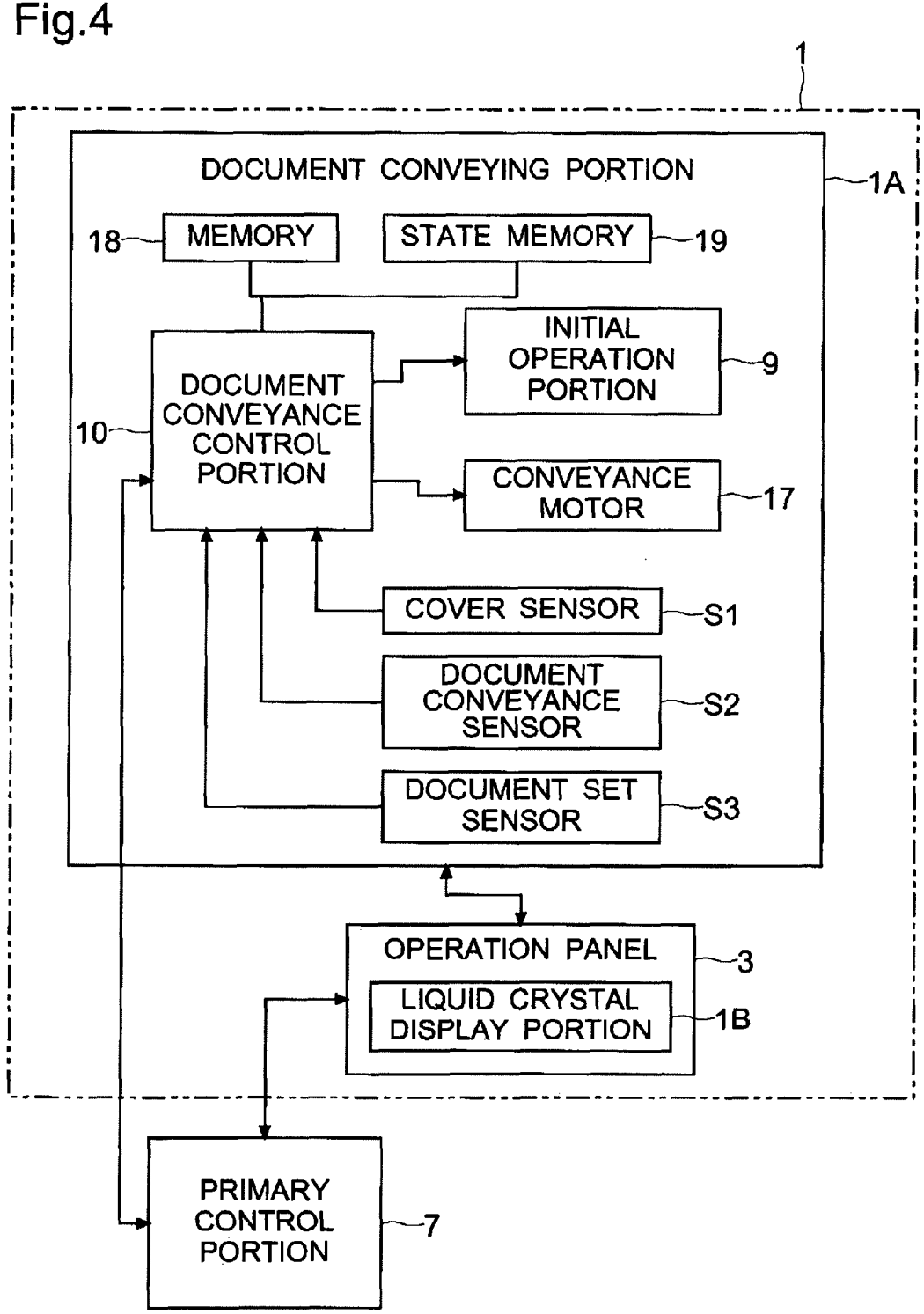
FIG. 4 is a block diagram illustrating an example of a configuration of a document feeding device.

Next, referring to FIG. 4, description is given of an example of a hardware configuration of the document feeding device 1 according to the embodiment. FIG. 4 is a block diagram illustrating an example of the configuration of the document feeding device 1.

The multifunction peripheral 100 of this embodiment includes the document conveying portion 1A for reading a document. Further, the document feeding device 1 includes the document conveying portion 1A. As illustrated in FIG. 4, the document feeding device 1 may include the operation panel 3 (liquid crystal display portion 1B) for displaying a reset request and the like, which is described later in detail. In other words, the document conveying portion 1A and the liquid crystal display portion 1B constitute the document feeding device 1. Note that, when the present invention is construed as an image forming apparatus including the document feeding device 1, the operation panel 3 may be installed at an arbitrary location as long as the operation panel 3 is provided as part of the image forming apparatus. Further, the primary control portion 7 and the like perform communication with the document feeding device 1, and hence the document feeding device 1 may be construed as including the other parts (for example, primary control portion 7 and the like).

Further, the document conveying portion 1A includes a document conveyance control portion 10 (corresponding to a determination portion) for controlling operation of the document conveying portion 1A. The document conveyance control portion 10 is a board including, for example, a CPU, a microcomputer, and a chip. The document conveyance control portion 10 performs communication with the primary control portion 7 or the like to receive an instruction from the primary control portion 7 or the like, thereby controlling actual operation of the document conveying portion 1A.

Further, the document conveying portion 1A is provided with a memory 18 that serves as a storage device for storing a program and data to be used by the document conveying portion 1A for control. For example, the memory 18 stores data, a program, and the like for adjusting a timing at which document conveyance is started or finished.

For example, when an instruction to read a document has been given from the primary control portion 7 for copying, scanning, or the like, the document conveyance control portion 10 uses the data and program stored in the memory 18. Then, the document conveyance control portion 10 drives the conveyance motor 17, to thereby rotate the document feeding roller 12, the document conveying roller pairs 14, and the like. As a result, the document is conveyed.

Further, the document conveyance control portion 10 controls operation of the initial operation portion 9 that performs the initial operation of the document feeding roller 12. In the initial operation, the document feeding roller 12 is lifted so that the number of document sheets placeable on the document tray 11 is not restricted to a small number (so that the document feeding roller 12 does not interfere when documents are placed). Specifically, the initial operation portion 9 includes members for lifting the document feeding roller 12, such as a motor and a solenoid.

For example, when the main power of the multifunction peripheral 100 or the document conveying portion 1A is turned on, the document conveyance control portion 10 causes the initial operation portion 9 to perform the initial operation. Further, when all document sheets have been conveyed from the document tray 11 for printing or scanning, the document conveyance control portion 10 may cause the initial operation portion 9 to perform the initial operation in preparation for the next setting and conveyance of documents. On the other hand, even when all document sheets have been conveyed from the document tray 11, if a cover 1Ac is opened or documents are jammed in the course of the conveyance, or if documents are being set onto the document tray 11, there is a fear that the initial operation cannot be performed appropriately (fear that the documents interfere with the initial operation). Accordingly, the document conveyance control portion 10 does not cause the initial operation portion 9 to perform the initial operation.

Further, the document conveying portion 1A is provided with sensors for detecting states of the document conveying portion 1A. For example, as illustrated in FIG. 4, the document conveying portion 1A is provided with a cover sensor S1 (corresponding to a state detecting portion and a cover opening/closing detecting portion), a document conveyance sensor S2 (corresponding to the state detecting portion and a document conveyance detecting portion), and a document set sensor S3 (corresponding to the state detecting portion and a document set detecting portion) (see FIG. 2).

In order to, when documents have been jammed, facilitate processing of removing the jammed documents, a casing portion (cover 1Ac) provided above the document feeding roller 12 and the document conveying path 13 is configured to be openable (see FIG. 2: an example of the opening/closing direction is indicated by a solid white arrow). With this configuration, the jammed documents can be removed by exposing the document conveying route. On the other hand, when the cover 1Ac is in an opened state (including a half-opened state), documents cannot be conveyed. Thus, the cover sensor S1 is provided for detecting the opening/closing of the cover 1Ac.

The cover sensor S1 differs in output between when the cover 1Ac is completely closed and when the cover 1Ac is not closed (for example, interlock switch). Note that, the cover sensor S1 may be, for example, an optical sensor capable of detecting the opening/closing of the cover 1Ac. Then, the output of the cover sensor S1 is input to the document conveyance control portion 10, and the document conveyance control portion 10 recognizes the state of the cover 1Ac regarding its opening/closing based on the output of the cover sensor S1.

The document conveyance sensor S2 is provided along a conveyance route of documents. The document conveyance sensor S2 differs in output between when the document conveyance sensor S2 is detecting the presence of a document and when the document conveyance sensor S2 is not detecting the presence of a document (for example, transmissive optical sensor). Note that, the document conveyance sensor S2 is not limited to the optical sensor, and may be any sensor as long as the sensor can detect the presence of a sheet. Then, the output of the document conveyance sensor S2 is input to the document conveyance control portion 10. The document conveyance control portion 10 determines whether or not the document is being conveyed appropriately based on the output of the document conveyance sensor S2.

The document conveyance control portion 10 recognizes that a jam has occurred in the course of document conveyance when the document conveyance sensor S2 does not detect the arrival (presence) of a document even when an allowable time range has elapsed after time when the arrival (presence) of a document should be detected, or when the document conveyance sensor S2 does not detect the passage (absence) of a document even when an allowable time range has elapsed after time when the passage (absence) of a document should be detected.

The document set sensor S3 is provided, for example, inside the document tray 11 (see FIG. 2). The document set sensor S3 differs in output between when there is a document on the document tray 11 and when there is no document on the document tray 11 (for example, optical sensor of actuator type). Note that, the document set sensor S3 may be any sensor as long as the sensor can detect the presence of a document.

Then, the output of the document set sensor S3 is input to the document conveyance control portion 10. The document conveyance control portion 10 determines whether or not there exists a document (there is a document set) on the document tray 11 based on the output of the document set sensor S3. When the output of the document set sensor S3 exhibits a value indicating the presence of a document, the document conveyance control portion 10 recognizes that there is a document set on the document tray 11.

Further, the document conveying portion 1A is provided with a state memory 19 for storing the state of the document conveying portion 1A in a nonvolatile manner. The state memory 19 stores the state of the document conveying portion 1A.

When the document conveyance control portion 10 detects such states as an opened state of the cover 1Ac, a state in which a jam has occurred in the course of document conveyance, and a state in which there is a document set on the document tray 11, the state memory 19 stores a fact that the document conveying portion 1A is in such a state. Note that, when the document conveyance control portion 10 recognizes that the cover 1Ac has been closed, that the jam has been resolved, or that there is no set document, the state memory 19 newly stores a fact that the document conveying portion 1A is in a state in which the cover 1Ac is in a closed state, a state in which there is no jam, or a state in which there is no set document.

(Respective Modes in Power Supply)

Figure 5:
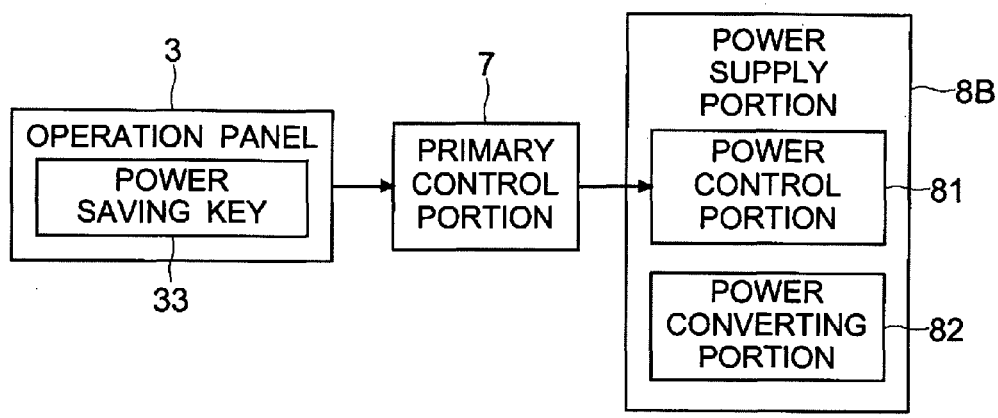
FIG. 5 is an explanatory diagram for describing a shift from a normal mode to a power saving mode.
Figure 6:
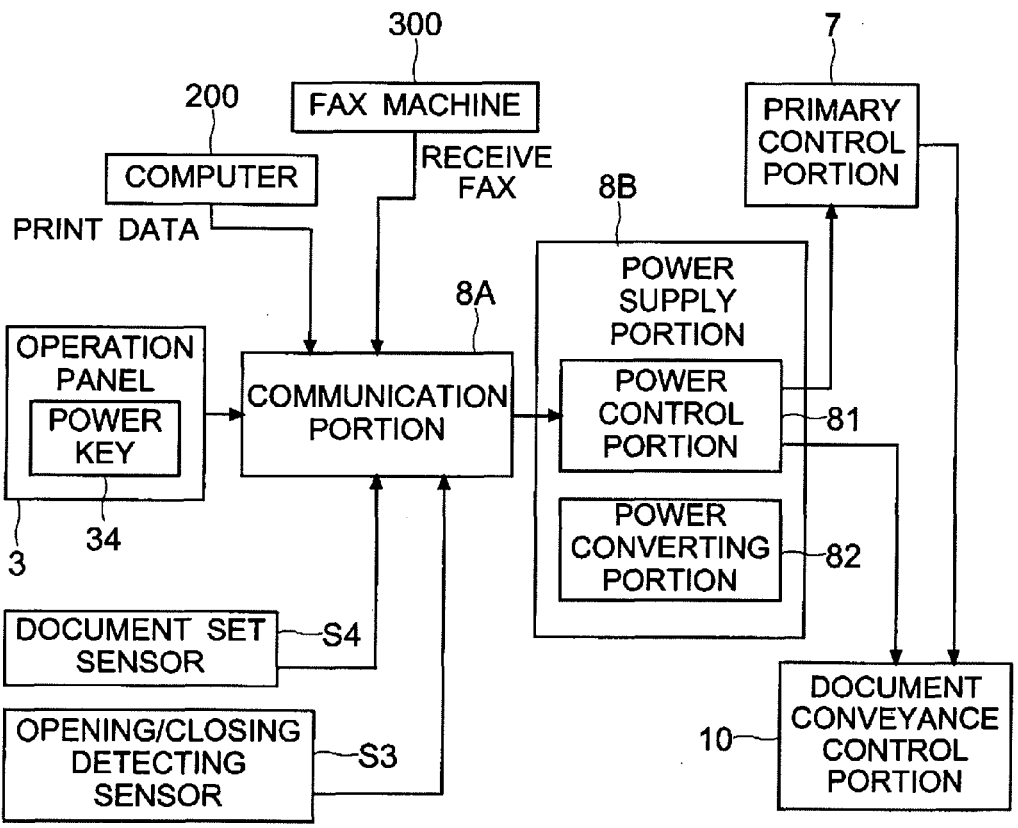
FIG. 6 is an explanatory diagram for describing cancellation of the power saving mode.

Next, referring to FIGS. 5 and 6, description is given of an example of power supply in the multifunction peripheral 100 according to the embodiment. FIG. 5 is an explanatory diagram for describing the shift from the normal mode to the power saving mode. FIG. 6 is an explanatory diagram for describing the cancellation of the power saving mode.

<When Main Power is Turned On>

First, when the main switch 83 is switched from an off-state to an on-state, to thereby turn on the main power, the power supply portion 8B is connected to the commercial power supply. Then, as described above, the power supply portion 8B generates a plurality of kinds of voltage.

Then, power is supplied from the power supply portion 8B to all the components of the multifunction peripheral 100, such as the primary control portion 7 and the document feeding device 1, and activation and warm-up of those components are started sequentially. For example, with the start of the power supply, a main program is read from the storage portion 72, which is performed when the main power is turned on. Further, for example, warm-up is performed so as to bring the multifunction peripheral 100 into a usable state by, for example, activating the primary control portion 7 and the document conveyance control portion 10, and heating the fixing portion 6B. Eventually, by turning on the main power, all functions of the multifunction peripheral 100 are brought into a usable state (normal mode).

In the normal mode, for example, in order to set the multifunction peripheral 100 ready for immediate use after the main power is turned on and the warm-up is completed, (all) respective components of the multifunction peripheral 100 are in a state of being supplied with power.

<Shift from Normal Mode to Power Saving Mode>

Next, referring to FIG. 5, description is given of the shift from the normal mode to the power saving mode. In the normal mode, the multifunction peripheral 100 is ready for immediate use, but certain power is consumed even when the multifunction peripheral 100 is not in use because the primary control portion 7 and the document feeding device 1 in a standby state consume power, and the temperature in the fixing portion 6B has to be maintained. To address this, the multifunction peripheral 100 of this embodiment has the power saving mode. In the power saving mode, the power consumption is reduced compared to the normal mode.

When a condition for shifting from the normal mode to the power saving mode is satisfied, a shift is made from the normal mode to the power saving mode. The condition for the shift may be determined arbitrarily. For example, when a predetermined time period has elapsed under a state in which a job is not being executed after input to the multifunction peripheral 100 (for example, input to the operation panel 3, and input of data to the communication portion 8A) has ceased to be performed, and the multifunction peripheral 100 has entered into an unused state (standby state), the primary control portion 7 determines that the condition for shifting to the power saving mode is satisfied. Further, alternatively, the depression of the power saving key 33 provided to the operation panel 3 may be used as the condition for shifting to the power saving mode.

When the condition for shifting to the power saving mode is satisfied, as illustrated in FIG. 5, the primary control portion 7 instructs the power control portion 81 of the power supply portion 8B to shift to the power saving mode. In response to this instruction, the power control portion 81 performs switching of power supply routes so that power is supplied only to the parts that are to be operated even in the power saving mode. Further, the power control portion 81 causes the power converting portion 82 to generate a voltage necessary just for the power saving mode. With this, the power supply to the components constituting the multifunction peripheral 100, such as the document feeding device 1, the image reading portion 2, the image forming portion 6, and the primary control portion 7, is stopped.

<Cancellation of Power Saving Mode: Power Saving Mode to Normal Mode>

In the power saving mode, power is supplied only to particular parts, such as the power supply portion 8B for performing the power supply, a cancellation detecting portion for detecting whether or not a condition for canceling the power saving mode has been satisfied (whether or not a cancellation signal has been generated), and the communication portion 8A for, in response to an output from the cancellation detecting portion, giving an instruction to cancel the power saving mode (instruction to shift to the normal mode) to the power supply portion 8B. Note that, instead of the communication portion 8A, the primary control portion 7 may be used to cancel the power saving mode (in this case, power is supplied to the primary control portion 7 even in the power saving mode).

When the condition for shifting from the power saving mode to the normal mode (condition for canceling the power saving mode) is satisfied, a shift is made from the power saving mode to the normal mode (cancellation of the power saving mode). The condition for the cancellation may be determined arbitrarily. For example, as illustrated in FIG. 6, reception of job data (for example, data for printing) from the external computer 200 or the fax machine 300 may be used as the condition for the cancellation (the communication portion 8A serves as the cancellation detecting portion). Alternatively, as illustrated in FIG. 6, the depression of the power key 34 (may be the power saving key 33) on the operation panel 3 may be used as the condition for the cancellation (the operation panel 3 serves as the cancellation detecting portion). Further, bringing up and bringing down of the document conveying portion 1A (opening/closing of the document conveying portion 1A) may be used as the condition for the cancellation. Note that, in order to detect the opening/closing of the document conveying portion 1A, an opening/closing detecting sensor S4 may be provided to the upper surface of the image reading portion 2 (see FIG. 1, the opening/closing detecting sensor S4 serves as the cancellation detecting portion). For example, the opening/closing detecting sensor S4 is an optical sensor for detecting that the document conveying portion 1A has been opened by a predetermined angle or larger.

Further, as illustrated in FIG. 6, detection by the document set sensor S3 which indicates that a document has been set on the document tray 11 may be used as the condition for the cancellation (the document set sensor S3 serves as the cancellation detecting portion).

When the condition for the cancellation is satisfied, the communication portion 8A (may be the primary control portion 7) instructs the power control portion 81 of the power supply portion 8B to return to the normal mode. In response to this instruction, the power control portion 81 performs switching so as to allow current to pass through all power supply routes so that power is supplied to all parts of the multifunction peripheral 100. Further, the power control portion 81 causes the power converting portion 82 to generate all kinds of voltage. With this, the power supply is resumed to all the components constituting the multifunction peripheral 100, such as the document feeding device 1, the image reading portion 2, the image forming portion 6, and the primary control portion 7. In this manner, when the predetermined condition for shifting to the power saving mode is satisfied, the power control portion 81 stops the power supply to the respective components and devices, and when the condition for canceling the power saving mode is satisfied, the power supply is resumed to the respective components and devices.

Note that, when the power supply is resumed to the document feeding device 1, the primary control portion 7, and the like with the cancellation of the power saving mode, as illustrated in FIG. 6, the power control portion 81 may notify the document conveyance control portion 10 of the cancellation of the power saving mode. Alternatively, the cancellation of the power saving mode may be notified to the document conveyance control portion 10 via the primary control portion 7. Note that, when the power supply has been resumed to the primary control portion 7 and the document feeding device 1 by the turning-on of the main switch 83, the power control portion 81 may notify the document conveyance control portion 10 of a fact that the power supply has been resumed by the turning-on of the main power, or the notification may be made to the document conveyance control portion 10 via the primary control portion 7. Based on such a signal from the main body side, the document conveyance control portion 10 can determine what is a cause of the resumption of the power supply (turning-on of the main power or cancellation of the power saving mode).

(Control Performed when Document Feeding Device 1 is Activated)

Figure 7:
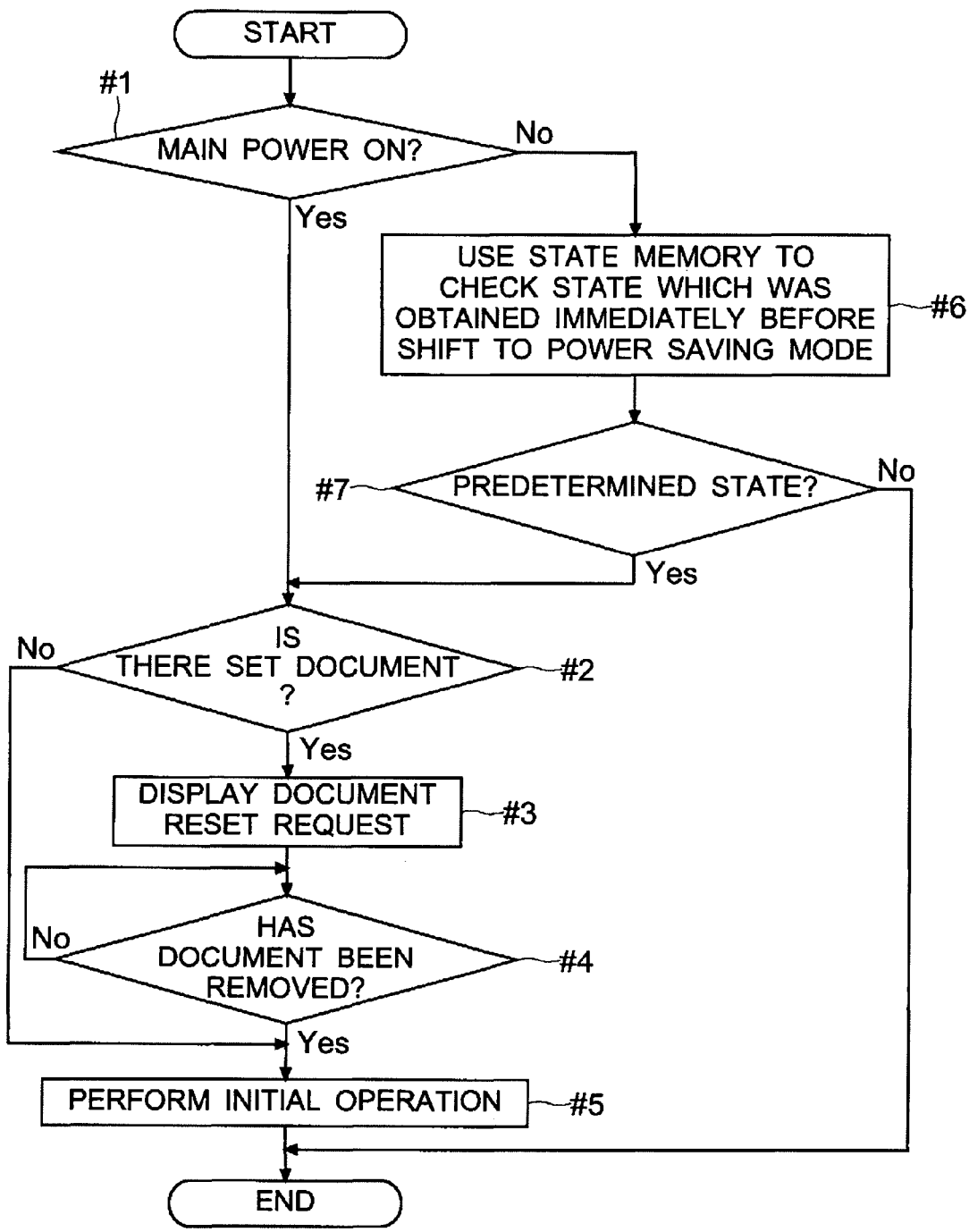
FIG. 7 is a flow chart illustrating an example of control performed when the document feeding device is activated.

Next, referring to FIG. 7, description is given of an example of control performed when the document feeding device 1 according to the embodiment is activated. FIG. 7 is a flow chart illustrating the example of the control performed when the document feeding device 1 is activated.

The start of FIG. 7 corresponds to a time point when the power supply is resumed to the document feeding device 1 by the turning-on of the main power through turning on the main switch 83 or by the cancellation of the power saving mode.

Then, the document conveyance control portion 10 of the document feeding device 1 checks whether or not the power supply has been resumed by the turning-on of the main power (turning-on of the main switch 83) (Step #1). Specifically, the cause of the resumption of the power supply (turning-on of the main power or cancellation of the power saving mode) is notified to the document conveyance control portion 10 from the power control portion 81, the primary control portion 7, and the like. In response thereto, the document conveyance control portion 10 checks the content of the notification. In this manner, based on information indicating the cause of the resumption of the power supply which is provided from the outside, the document conveyance control portion 10 can determine which one of the turning-on of the main power and the cancellation of the power saving mode has caused the resumption of the power supply.

Then, when the cause is the turning-on of the main power (Yes in Step #1), the document conveyance control portion 10 checks the output of the document set sensor S3, to thereby determine whether or not there is a set document (Step #2). When there is a set document (Yes in Step #2), the document conveyance control portion 10 causes the liquid crystal display portion 1B of the operation panel 3 to display a document reset request (Step #3). Specifically, the document conveyance control portion 10 transmits data indicating that the document reset request should be displayed to the operation panel 3 or the primary control portion 7.

The document reset request is displayed by using characters (letters) or a diagram (may be a moving image) (not particularly shown), and indicates that the set document needs to be removed temporarily and then be set again. The above-mentioned request for the document reset is made so as to perform the initial operation. In other words, the document reset request is made because the initial operation cannot be performed appropriately if the document remains set on the document tray 11.

After the displaying of the document reset request (after Step #3), the document conveyance control portion 10 checks the output of the document set sensor S3, to thereby determine whether or not the document has been removed (Step #4). Note that, the determination regarding whether or not the document has been removed is continuously made until the document is removed (loop: No in Step #4 to Step #4).

Further, when the cause is the turning-on of the main power (Yes in Step #1), and there is no set document (No in Step #2), or when the cause is the turning-on of the main power (Yes in Step #1), and a set document has been removed temporarily (Yes in Step #4), the document conveyance control portion 10 controls the initial operation portion 9 to perform the initial operation of moving upward (withdrawing) the document feeding roller 12 (Step #5).

On the other hand, when the cause is not the turning-on of the main power (when the cause is the return from the power saving mode: No in Step #1), the document conveyance control portion 10 uses the state memory 19 to check the state of the document feeding device 1 which was obtained immediately before the shift to the power saving mode (Step #6). Then, the document conveyance control portion 10 determines whether or not the state of the document feeding device 1 which was obtained immediately before the shift to the power saving mode is a predetermined state (Step #7).

In this embodiment, when the power saving mode is canceled, in principle, the initial operation is not performed. However, when the state which was obtained immediately before the shift to the power saving mode had an abnormality, and it is unclear that the initial operation was performed properly at the time of the shift to the power saving mode, the initial operation is performed also when the power saving mode is canceled (restricting execution of the initial operation).

Here, for example, the "predetermined state" may be a state in which the shift to the power saving mode has conceivably been performed with an abnormality remaining unaddressed or with the initial operation not having been performed, such as the state in which the cover 1Ac is opened, the state in which a jam has occurred in the course of the document conveyance, and the state in which there is a document set on the document tray 11. On the other hand, the "predetermined state" does not include a state in which no particular abnormality was recognized in the document feeding device 1 immediately before the shift to the power saving mode, such as a state in which the cover 1Ac is closed, a state in which there is no jam, and a state in which there is no set document.

When the state of the document feeding device 1 which was obtained immediately before the shift to the power saving mode is the predetermined state (Yes in Step #7), it is preferred that the initial operation be performed along with the return to the normal mode. Accordingly, the flow proceeds to Step #2. On the other hand, when the state of the document feeding device 1 which was obtained immediately before the shift to the power saving mode is not the predetermined state (No in Step #7), this means that the initial operation has been performed properly before the shift to the power saving mode, and hence this control is finished without performing the initial operation (end). As a result, the initial operation is not performed when there is no necessity. Therefore, even when the user has set a document and canceled the power saving mode, the reset of the document is not required unless there is a necessity therefor.

As described above, according to the invention of this embodiment, the document feeding device 1 includes: the document feeding portion (document feeding roller 12) for feeding a document from the document tray 11 on which one or a plurality of sheets of documents are placed; the document set detecting portion (document set sensor S3) for detecting whether or not there is a document set on the document tray 11; the determination portion (document conveyance control portion 10) for determining whether power supply to the device is started by the turning-on of the main power through turning on the main switch 83 or by the cancellation of the power saving mode; the initial operation portion 9 for performing the initial operation of initializing the document feeding portion (document feeding roller 12) under the state in which there is no set document, performing the initial operation when the power supply to the device is started by the turning-on of the main power, and restricting execution of the initial operation (not performing the initial operation) when the power supply to the device is started by the cancellation of the power saving mode; and the display portion (liquid crystal display portion 1B) for displaying, when the initial operation is to be performed and there is a set document at the start of the power supply, the reset request making a request for reset of the document.

With this configuration, even when a document has been set and the power saving mode is canceled, the reading of the document can be performed without a request for the reset of the document. Accordingly, even when the power supply is resumed under the state in which there is a set document, there is a case where the document does not need to be reset, resulting in improved usability of the document feeding device 1.

On the other hand, when the power supply to the device is started by the turning-on of the main power, the initial operation is performed. The turning-on of the main power is performed with low frequency, for example, the first thing in the morning. Accordingly, if an unnecessary reset request for the document is made along with the initial operation, this does not present a significant drawback. Rather, considering that the turning-on/-off of the main power is performed for such a purpose as a reset (for the purpose of initialization), an error can be kept from occurring in the course of the document conveyance because when the power supply is resumed by the turning-on of the main power, the initial operation is always performed to secure the initialization without fail.

Further, the document feeding device 1 includes: the state detecting portion (cover sensor S1, document conveyance sensor S2, document set sensor S3, or the like) for detecting the state of the device; and the state memory 19 for storing a pre-stop state indicating the state of the device which was obtained before the power supply is stopped, and the initial operation portion 9 exceptionally performs the initial operation when the pre-stop state is the predetermined state when the power supply is started by the cancellation of the power saving mode, and the display portion (liquid crystal display portion 1B) displays the reset request when there is a set document at the start of the power supply. With this configuration, when an abnormal state has been detected, the initial operation is performed properly, with the result that an error can be kept from occurring in the course of the document conveyance.

Further, specifically, the state detecting portion includes any one or more of: the cover opening/closing detecting portion (cover sensor S1) for detecting the opening/closing of the cover 1Ac of the device; the document conveyance detecting portion (document conveyance sensor S2) provided along the conveyance route of the document, for detecting a jam; and the document set detecting portion (document set sensor S3), and the state memory 19 stores, as the predetermined state, any one or more of: the state in which the cover 1Ac is opened; the state in which the document is jammed; and the state in which there is a set document. With this configuration, when a state considered to be abnormal occurs in the course of the document conveyance, the initial operation is performed properly, with the result that an error can be kept from occurring in the course of the document conveyance.

Further, the initial operation portion 9 performs the initial operation of lifting the document feeding portion (document feeding roller 12) when the document set detecting portion (document set sensor S3) detects that there is no document left on the document tray 11. With this configuration, when the conveyance of the document is completed for copying or transmission, and before the shift to the power saving mode is made (during the normal mode), the initial operation of lifting the document feeding portion (document feeding roller 12) is performed. Accordingly, it is possible to prevent occurrence of such a problem related to the document conveyance that the number of document sheets placeable on the document tray 11 is restricted to a small number.

Further, when the power supply is resumed by the cancellation of the power saving mode, even if there is a set document, there is no need to reset the document, and hence it is possible to provide an image forming apparatus (for example, multifunction peripheral 100) provided with a user-friendly document feeding device 1.

Further, the present invention may be construed as an invention of a method of controlling the document feeding device 1. Specifically, the method of controlling the document feeding device 1 includes: feeding a document from the document tray 11 on which one or a plurality of sheets of documents are placed; detecting whether or not there is a document set on the document tray 11; determining whether the power supply to the document feeding device 1 is started by the turning-on of the main power through turning on the main switch 83 or by the cancellation of the power saving mode; performing the initial operation of initializing the document feeding portion for feeding the document from the document tray 11, when there is no set document and the power supply to the document feeding device 1 is started by the turning-on of the main power, and restricting execution of the initial operation (not performing the initial operation) when the power supply to the document feeding device 1 is started by the cancellation of the power saving mode; and displaying, when the initial operation is to be performed and there is a set document at the start of the power supply, a reset request making a request for reset of the document.

Further, the method of controlling the document feeding device 1 may include: detecting the state of the device; storing the pre-stop state indicating the state of the device which was obtained before the power supply is stopped; exceptionally performing the initial operation when the pre-stop state is the predetermined state when the power supply is started by the cancellation of the power saving mode; and displaying the reset request when there is a set document at the start of the power supply.

Further, the method of controlling the document feeding device 1 may include: detecting any one or more of the opening/closing of the cover of the document feeding device 1; a jam of the document along the conveyance route; and a set document; and storing, as the predetermined state, any one or more of: the state in which the cover is opened; the state in which the document is jammed; and the state in which there is a set document.

Further, the method of controlling the document feeding device 1 may include performing the initial operation of lifting the document feeding portion for feeding the document from the document tray 11 when it is detected that there is no document left on the document tray 11.

The embodiment of the present invention has been described above, but the scope of the present invention is not limited thereto. The present invention may be implemented by making various modifications thereto without departing from the gist of the present invention.

What is claimed is:

1. A document feeding device, comprising:
a document feeding portion for feeding a document from a document tray on which one or a plurality of sheets of documents are placed;
a document set detecting portion for detecting whether or not there is a document set on the document tray;
a determination portion for determining whether power supply to the document feeding device is started by turning-on of main power through turning on a main switch or by cancellation of a power saving mode;
an initial operation portion for performing an initial operation of initializing the document feeding portion under a state in which there is no set document, performing the initial operation when the power supply to the document feeding device is started by the turning-on of the main power, and restricting execution of the initial operation when the power supply to the document feeding device is started by the cancellation of the power saving mode; and
a display portion for displaying, when the initial operation is to be performed and there is a set document at the start of the power supply, a reset request making a request for reset of the document.

2. A document feeding device according to claim 1, further comprising:
a state detecting portion for detecting a state of the document feeding device; and
a state memory for storing a pre-stop state indicating a state of the document feeding device which was obtained before the power supply is stopped,
wherein the initial operation portion performs the initial operation when the pre-stop state is a predetermined state when the power supply is started by the cancellation of the power saving mode, and
wherein the display portion displays the reset request when there is a set document at the start of the power supply.

3. A document feeding device according to claim 2,
wherein the state detecting portion comprises any one or more of: a cover opening/closing detecting portion for detecting opening/closing of a cover of the document feeding device; a document conveyance detecting portion provided along a conveyance route of the document, for detecting a jam; and the document set detecting portion, and
wherein the state memory stores, as the predetermined state, any one or more of: a state in which the cover is opened; a state in which the document is jammed; and a state in which there is a set document.

4. A document feeding device according to claim 1, wherein the initial operation portion performs the initial operation of lifting the document feeding portion when the document set detecting portion detects that there is no document left on the document tray.

5. An image forming apparatus, comprising the document feeding device according to claim 1.

6. A method of controlling a document feeding device, comprising:
- feeding a document from a document tray on which one or a plurality of sheets of documents are placed;
- detecting whether or not there is a document set on the document tray;
- determining whether power supply to the document feeding device is started by turning-on of main power through turning on a main switch or by cancellation of a power saving mode;
- performing an initial operation of initializing a document feeding portion for feeding a document from the document tray, when there is no set document and the power supply to the document feeding device is started by the turning-on of the main power, and restricting execution of the initial operation when the power supply to the document feeding device is started by the cancellation of the power saving mode; and
- displaying, when the initial operation is to be performed and there is a set document at the start of the power supply, a reset request making a request for reset of the document.

7. A method of controlling a document feeding device according to claim 6, further comprising:
- detecting a state of the device;
- storing a pre-stop state indicating a state of the device which was obtained before the power supply is stopped;
- performing the initial operation when the pre-stop state is a predetermined state when the power supply is started by the cancellation of the power saving mode; and
- displaying the reset request when there is a set document at the start of the power supply.

8. A method of controlling a document feeding device according to claim 7, further comprising:
- detecting any one or more of: opening/closing of a cover of the document feeding device; a jam of the document along a conveyance route; and a set document; and
- storing, as the predetermined state, any one or more of: a state in which the cover is opened; a state in which the document is jammed; and a state in which there is a set document.

9. A method of controlling a document feeding device according to claim 6, further comprising performing the initial operation of lifting the document feeding portion for feeding the document from the document tray when it is detected that there is no document left on the document tray.

* * * * *